UNITED STATES PATENT OFFICE.

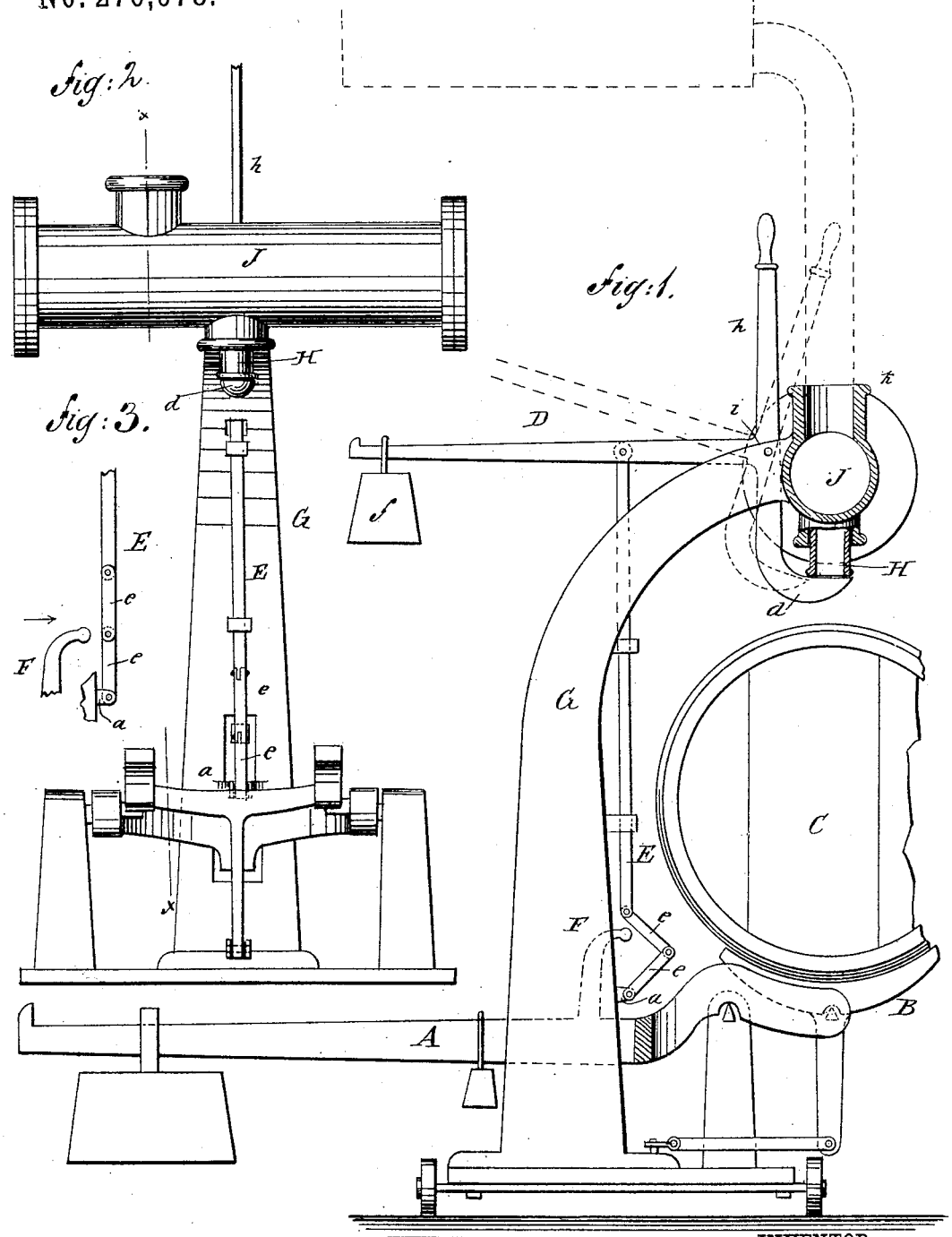

NICHOLAS A. JONES, OF LEAVENWORTH, KANSAS.

AUTOMATIC WEIGHING-SCALE.

SPECIFICATION forming part of Letters Patent No. 270,078, dated January 2, 1883.

Application filed July 12, 1882. (No model.)

*To all whom it may concern:*

Be it known that I, NICHOLAS A. JONES, of Leavenworth, in the county of Leavenworth and State of Kansas, have invented a new and Improved Automatic Weighing and Filling-Out Machine, of which the following is a full, clear, and exact description.

This invention relates to a machine or device for weighing and filling out from a cask, bin, or other bulk-supply into packages or receptacles stated quantities of any dry or liquid material which will flow from such bulk-supply through a spout, hopper, or pipe; and my invention consists principally of valve-operating mechanism and scales or weighing mechanism connected by a toggle or jointed connecting-rod, the steelyard of the scales being provided with an arm for breaking the alignment of the connecting-rod for operating the valve for cutting off the flow of material when the proper quantity shall have been filled into the package or receptacle.

The invention also consists in the construction, arrangement, and combination of parts, all as hereinafter fully described.

Reference is to be had to the accompanying drawings, forming part of this specification, in which similar letters of reference indicate corresponding parts in all the figures.

Figure 1 is a sectional elevation of my new and improved weighing and filling-out machine, taken on the line $x\ x$ of Fig. 2. Fig. 2 is a front elevation of the same, and Fig. 3 is a detailed side elevation of the toggle or jointed connecting-rod and the arm of the steelyard.

A represents the steelyard of the scales or weighing mechanism, and B represents the platform of the same, upon which the package or receptacle C to be filled is placed. The steelyard is formed or provided with the upwardly-projecting arm, F, which is arranged to come in contact with the toggle-pieces $e\ e$ of the connecting-rod E when the steelyard is balanced upward by the weight of material in the package or receptacle C. The rod E is connected at its upper end to the arm D and at its lower end to the eye $a$ of the curved standard G of the machine or device. The arm D is provided with the weight $f$, is pivoted at $i$ in the upper end of the curved standard G, and is formed with the curved downwardly-projecting valve or cut-off arm $d$ and with the upwardly-projecting lever, $h$, as shown in Fig. 1.

H is the filling-pipe, which stands immediately over the package or receptacle C, and the lower end of the valve or cut-off arm $d$ is adapted, when the parts are in the position shown in full lines in Fig. 1, to close this filling-pipe and cut off the flow of the material. This filling-pipe leads from the horizontal chamber or pipe J, which is formed at the upper end of the standard G, and this chamber is provided with the collared inlet-opening $k$, into which the pipe, hopper, spout, or other conduit leading from the cask, tank, bin, or other bulk-supply is placed, as shown in dotted lines in Fig. 1.

In use, the device having been connected with the supply, and the receptacle or package having been put in place upon the platform B, the arm D is set upward to the position shown in dotted lines in Fig. 1 by drawing forward upon the lever $h$ for opening the filling-pipe H and permitting the material to flow. The upward movement of the arm D will bring the toggle-pieces $e\ e$ into line with the main portion of the rod E, as shown in Fig. 3, and this will cause the arm D to be held by the connecting-rod E in its elevated position, in which position it will remain until the desired quantity of material has passed into the receptacle or package. The required quantity having been reached, its weight will cause the steelyard A to move upward, which will bring the arm F in contact with the toggle-pieces $e\ e$ and move them out of line with the main part of the rod E, and thus permit the arm D to drop, which will cause the valve-arm $d$ to cut off the flow from the pipe H.

Thus constructed, it will be seen that the device is very simple, and it is very accurate, since there is practically no friction between the parts of the machine, and the machine is compact and can be easily moved from place to place and can be easily connected with the supply.

Having thus described my invention, what I claim as new, and desire to secure by Letters Patent, is—

1. The combination, with the valve-operating arm D and steelyard A, formed with the arm F, of the jointed connecting-rod E, substantially as and for the purposes described.

2. The weighted arm D, formed with the lever $h$ and cut-off or valve arm $d$, and pivoted in the curved frame G, for cutting off the flow of material, substantially as described.

3. The weighing and filling-out machine herein shown and described, consisting of the curved frame G, the steelyard A, platform B, arm D, and jointed connecting-rod E, the arm D being formed with the cut-off arm $d$ and lever $h$, the steelyard A with the arm F, substantially as and for the purposes set forth, and the frame with the chamber J, having the openings H and $k$, substantially as set forth.

NICHOLAS A. JONES.

Witnesses:
JOHN G. WEIMAR,
WM. TYLER.